United States Patent [19]

Kaiser

[11] Patent Number: 4,572,815
[45] Date of Patent: Feb. 25, 1986

[54] PEANUT HULL THERMAL INSULATION

[76] Inventor: Walter L. Kaiser, 7520 Peach St., Erie, Pa. 16509

[21] Appl. No.: 473,002

[22] Filed: Mar. 7, 1983

[51] Int. Cl.$^4$ ............................................. C08J 11/00
[52] U.S. Cl. ...................................... 264/115; 52/741; 52/DIG. 9; 52/404; 524/15
[58] Field of Search .................... 52/DIG. 9, 404, 741, 52/743, 750, 406, 407; 428/326, 336; 252/62; 264/115, 128; 524/15

[56] References Cited

U.S. PATENT DOCUMENTS

| | | | |
|---|---|---|---|
| 77,991 | 5/1868 | Lowrey | 106/81 |
| 310,461 | 1/1885 | Ordway | 106/81 |
| 1,712,965 | 5/1929 | Maranville | 264/46.5 |
| 1,718,011 | 6/1929 | Vogt | 162/11 |
| 1,921,518 | 8/1933 | Frobisher | 52/405 |
| 2,033,411 | 3/1936 | Carson | 264/115 |
| 2,034,489 | 3/1936 | Scherer | 52/407 |
| 2,645,587 | 7/1953 | Williamson | 428/326 |
| 2,687,556 | 8/1954 | Othmer et al. | 264/124 |
| 3,000,144 | 9/1961 | Kitson | 52/593 |
| 3,664,076 | 5/1972 | McCoy | 52/DIG. 9 |
| 3,982,362 | 9/1976 | Moore | 52/DIG. 9 |
| 4,068,429 | 1/1978 | Moore | 52/204 |
| 4,343,751 | 8/1982 | Kumar | 264/115 |

FOREIGN PATENT DOCUMENTS

| | | | |
|---|---|---|---|
| 1683478 | 10/1977 | Fed. Rep. of Germany | 52/406 |
| 1419834 | 10/1964 | France | 428/323 |
| 29661 | 3/1975 | Japan | 524/15 |

Primary Examiner—John E. Murtagh
Assistant Examiner—Andrew Joseph Rudy
Attorney, Agent, or Firm—Charles L. Lovercheck; Wayne L. Lovercheck; Dale R. Lovercheck

[57] ABSTRACT

A method of making insulation wherein peanut hulls are screened successively through three screens providing a very coarse grade of hulls to be reground, a coarse grade and a medium grade for blown insulation, and a fine grade mixed with dust formed into building panels.

1 Claim, 6 Drawing Figures

U.S. Patent  Feb. 25, 1986  4,572,815
FIG. 1
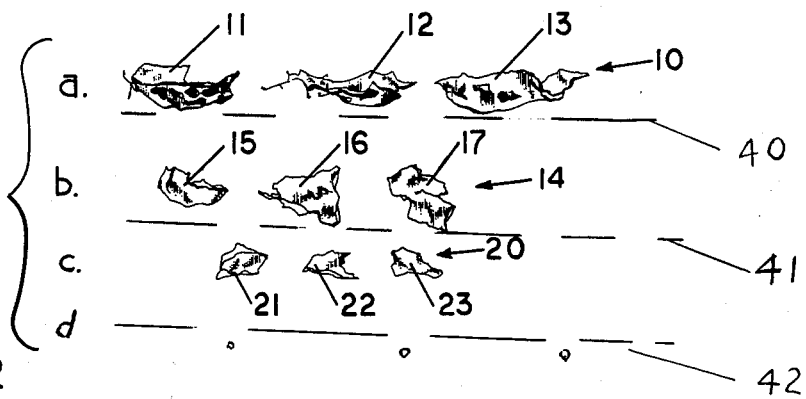
FIG. 2
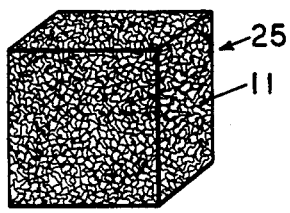
FIG. 3
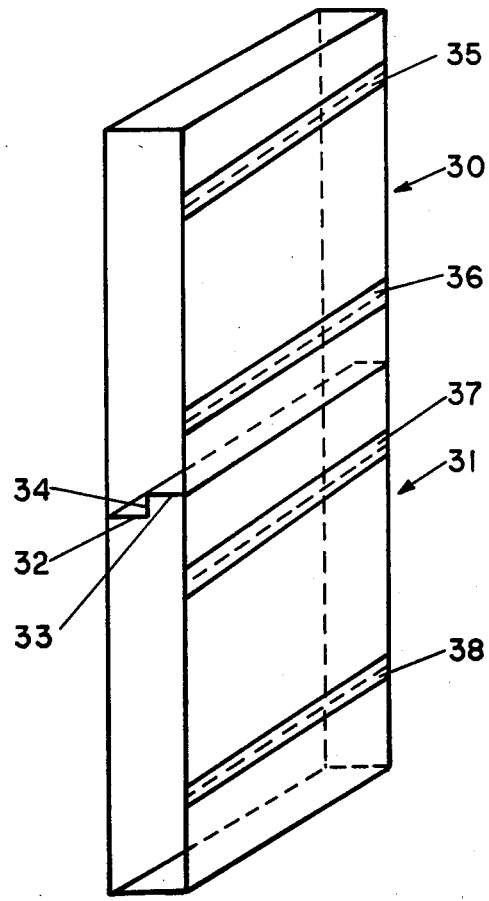
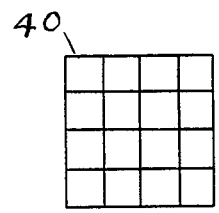
FIG. 4
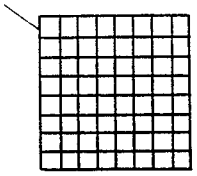
FIG. 5
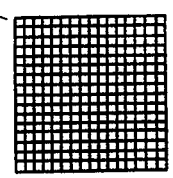
FIG. 6

PEANUT HULL THERMAL INSULATION

REFERENCE TO PRIOR ART

Applicant is aware of the following U.S. Pat. Nos.:
77,991
310,461
1,712,965
1,921,518
2,645,587
2,687,556
3,000,144

GENERAL DESCRIPTION OF INVENTION

This invention relates to a high quality insulation material consisting of a natural biodegradable organic fiber to aid America in its desire for less dependance on foreign oil by reducing its use through assorted means of conservation, one of which is thermal insulation.

A method of making thermal insulation is disclosed wherein peanut hulls, as received from the shelling machines, are screened by a #4 screen and any hulls that will not pass through the screen are reground. The shells that will pass the #4 screen are then re-screened and the shells that will not pass through the #8 screen are used for blowing into walls.

The shells that pass through the #8 screen are then re-screened through a #16 screen and those which will not pass through it are used for a finer type insulation to be blown into walls. The air pressure is reduced in a duct below the #8 screen and below the #16 screen to remove dust from the hulls thus providing cleaner hulls for blowing to reduce dust in the environment for later blowing operations.

The hulls that pass through the #16 screen and dust will then be mixed with a fire retardant binder and compressed into panels for use as wall insulation between studding of buildings.

In prior years before the 1950's, the building industry considered insulation for domestic homes and commercial construction to be unnecessary due to the fact that energy was relatively cheap and that insulation would only add undue cost to the price of the building.

The organic fiber referred to in this invention is a by-product of the peanut industry consisting of the hulls only, and when properly processed and chemically treated produces an insulation material with thermal propertes sometimes called "R" values far superior to any fiber insulation including, newsprint, (cellulose insulation processed from shredded newspaper) rockwool, or 6" of fiberglass, with a thermo resistance value of "R" 19 and only "R" 11 for exterior walls of domestic homes of 3½", including the vapor barrier.

The hulls received from the shelling plants are coarse (CPH-F) which will not flow through the pneumatic applicator, therefore, they must be reduced to required size by a mechanical means, i.e. hammermill, shredder, or grinder and the resulting hulls that are too coarse for use screened off by a #4 screen.

In the process of reducing the coarse hulls to the required grade necessary for pneumatic application, the hulls that pass through the #4 screen presents two grades of hulls which must be screen separated using #8 and #16 mesh. These two grades of hulls are objectionable to the person handling them due to the fact the high volume air pressure from the pneumatic applicator forcing the hulls through 100' of 2" or 2½" corrigated flexible hose of the applicator presents a dust problem by entrained small particles remaining airborne and reducing the workman's vision in the work area. Therefore, it becomes necessary to screen separate these fines from the 0.25"×0.25" grade that were retained by the #8 screen which are to be used only for insulating homes by a pneumatic applicator.

Through my research I have learned that it is difficult to ignite peanut hulls even though they are not impregnated with a chemical fire retardant without administering forced oxygen to reduce the hulls to ash. I have discovered that by passing the 0.25×0.25 domestic grade hulls which have had the #8 and #16 mesh fines mechanically screen separated over a rectangular duct adequately sized and covered with #8 screen, capable of handling 8 to 10 ton per hour with induced power vacuum of over 200 CFM, the resulting filtered insulation will meet air quality standards now in effect.

The desired grade of ground hulls after vacuum screening to remove the residue of any hulls which will pass a #8 mesh and #16 mesh are applicable for pneumatic application for blowing in exterior walls and caps of homes.

Any surplus hulls of all four grades of hulls will be compressed into panels. For wall studs 16" on centers with the physical size of the void, the panels will be 14.5" wide ×3⅝" deep and 46.5" long. In the case of wall studs 22" on centers, the panel will be 20.375" wide ×3⅝" deep and 46.5" long. However, these panels can be manufactured to accommodate any size void of building construction.

The panels will be compressed, or vacuum formed, using a fire retardant liquid, cured and then heat sealed into a plastic wrapper 0.004 inches thick to serve a dual purpose. (A) As a shipping container to prevent friction in handling during transit from degrading the panels; and (B) in the event of a roof leak of a home insulated with a pre fab wall panel, the moisture will have to seek its level and run off at the plate, avoiding saturation which could cause a real major problem.

Peanut hulls are naturally difficult to burn without any protection from a fire retardant and have a low kindling temperature and require a high induced oxygen source to keep any lighted embers from smoldering out.

With reference to the thermo resistance of this biodegradable organic fiber, peanut hulls used as a high quality insulation compared to exiting insulation known. I have conducted these tests using a small simulated house incorporating two Laxan trays, side by side 8" long by 4¼" wide and 4" in height with holes drilled through front center at 1", 2", 3" and 4" from top to receive the 7½" helix of a round dial thermometer with degree readings from 0° to 180°. A 200 watt heat lamp with a stainless steel shield extends downward directly over both trays exactly 1" above the fiber.

The following tests were conducted on a per minute basis, one hour for each inch of density of fiber, plus 3⅝" density for exterior wall coverage. All tests were conducted under ambient conditions with all tests starting at 68°.

At the present time, fiberglass insulation is available on the market with 6" and 3½" densities.

For the benefit of time consumption and comparison, I evaluated the comparable temperature readings at 4" densities of peanut hulls for each test, while the fiberglass (R-19) was calculated with 6", compressed to the 4" level. Thus, the fiberglass had two or more inches of thickness over all other test of organic fiber at only 4".

After one hour of thermo resistance testing at 4" thickness, and starting at 68°, 6" of fiberglass caused a temperature rise to 83°, while the cellulosic (newsprint) insulation terminated at 79.5°. In comparison with the above temperatures, coarse peanut hulls (CPH-F) rose from 68° to only 73°. The organic fiber 0.25×0.25 grade of peanut shells for pneumatic application terminated at 71.5°. Number 8 screened fiber stopped at 70°. It required one hour for the heat to penetrate the #16 mesh fly screened fiber (FSH-F) only 1° from 68° to 69°.

In the next test, I compared the heat transfer of mixed 0.25×0.25 grade peanut hulls with cellulosic insulation newsprint which is shredded 50/50 by volume. The cellulosic insulation alone had a temperature rise from 68° to 79.5°. By mixing 50% of 0.25×0.25 grade of peanut hulls with 50% of cellulose insulation, the heat penetration at 4" density terminated at only 71° for a resistance benefit of 8.5°.

Pressed Wall Panel

This portion of the invention relates to a pre-fab wall panel, a convenience designed for the home builder to insulate a home while under construction from the inside, rather than complete the interior and drill holes on the exterior for pneumatic insulation application.

Due to the fact that in the process of grinding the coarse peanut hulls (CPH-F) to a required grade, 0.25×0.25 for pneumatic application, it is impossible not to accumulate unwanted #8 and #16 mesh fines, which would have to be disposed of at a cost, to a land fill, therefore, by utilizing these fines by applying an approved fire retardant adhesive, such as for example sodium silicate, pressed or extruded into a panel of 14.5" wide, 3⅝" deep, and 46.5" long to be installed into the void between wall studs 16" on center, one panel at floor level, the other panel on top, filling the 93" void. This gives the consumer a choice of four wall panels with assorted "R" values.

The panel can be separated by a carpenter saw at areas under windows and off-sets in building construction to pass conduit or electrical wires through, or notched out at electrical junction boxes and recessed lighting. The panel employs two adhesive strips with backing to be removed by the contractor to expose the adhesive for adhering to the outside sheeting, holding the panel to the wall temporarily until the wall board of paneling can be installed.

OBJECTS OF THE INVENTION

It is an object of the invention to provide an improved insulation material.

Another object of the invention is to provide an insulation material that is simple in construction, economical to manufacture, and simple and efficient to use.

Another object of the invention is to provide an improved insulation made of peanut shells of approximately 0.25×0.25 inches minimum size material.

Another object of the invention is to provide an improved insulation panel, with a choice of "R" value and cost.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

FIG. 1A is a view of three pieces of coarse peanut hulls to be ground.

FIG. 1B is a view of three pieces of ground peanut hulls that passed through a number 4 screen but were retained by the number 8 mesh screen.

FIG. 1C is a view of three pieces of peanut hulls that passed through a number 8 mesh screen.

FIG. 1D (fines) #16 mesh-fly screen.

FIG. 2 is a view of a small cube made of peanut hulls of the type shown in FIG. 1C held together by a fire retardant adhesive.

FIG. 3 is a view of two panels having shiplap edges to impede any direct air current to interior walls.

FIG. 4 is a view of a part of a number four screen.

FIG. 5 is a view of a part of a number eight screen.

FIG. 6 is a view of a part of a number sixteen screen.

DETAILED DESCRIPTION OF THE DRAWINGS

Now with more particular reference to the drawings, FIGS. 1A, 1B and 1C show four sizes of screened peanut hulls indicated generally at 10. The individual pieces of hulls removed from a mass of hulls by a #4 screen 40 are indicated generally at 11, 12 and 13, which are to be ground.

FIG. 1B shows three individual pieces of peanut hulls 14 made up of individual hulls 15, 16 and 17 of a size that passed through the #4 screen 40 but were retained by the #8 screen 41. These hulls in FIG. 1B are of a first size to be used as blown insulation.

FIG. 1C shows a group 42 of peanut hulls indicated individually at 21, 22 and 23. These hulls passed through but were retained by the #8 screen and are also used as second grade hulls for blown insulation.

Those that passed through the #16 screen along with fines are used to make the panel 30. A number 4 screen has 4 meshes per inch. A number 8 has 8 meshes per inch. A number 16 has 16 meshes per inch.

The peanut hulls 25 as they come from the shelling machines are formed of various sizes and shapes and the hulls themselves are held together by a suitable fire retardant adhesive, for example by sodium silicate. The hulls form a substantially fire proof panel since the peanut hulls themselves will barely support combustion. The fire retardant makes the hulls fireproof.

Various shapes 25 could be used made for inserting between the studdings of a building. The rectangular shape could be wrapped in a material such as Mylar to insure that it does not become saturated with water in case of a roof leak or other emergency.

In the embodiment of the invention shown in FIG. 3, the peanut hulls are formed into irregular shapes indicated at 30 and 31. Shiplap edge 32 is formed on the upper edge of the panel 31 and on the lower edge of the panel 30 so that the joint has two parallel surfaces 32 and 33 disposed in a generally horizontal plane and a mating surface 34 generally perpendicular to the surfaces 32 and 33 for the purpose of retarding a direct air flow to the interior wall.

Adhesive strips 35, 36, 37 and 38 are formed on the panels for holding them in place until the interior drywall or wall paneling is put in place.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of making insulation from peanut hulls consisting of screening and separating said hulls into sizes so that a maximum of said hulls are suitable for pneumatic application as insulation in walls of existing buildings and the remainder of said hulls suitable for use in insulation paneling comprising:

providing shelled peanut hulls, grinding said hulls in a grinder to produce a minimum amount of fine parts and, screening said ground hulls using a coarse screen of approximately 4 meshes per inch, regrinding the hulls that are retained by the coarse screen, screening said hulls that pass through said coarse screen with a medium screen of about 8 meshes per inch, using said hulls that are retained by said medium screen, which consist of about fifty percent (50%) of said hulls ground up, for blown insulation in walls of buildings, screening said hulls that pass through said medium screen with a fine screen at about 16 mesh per inch, adding a binding material to said hulls that pass through said fine screen and forming said hulls that pass through said medium screen but are retained by said fine screen into a first type of panel, curing said panel, adding a binder material to said particles that pass through said fine screen, forming said material that passes through said fine screen into a second grade of panel and curing said binder in said second grade of panel.

* * * * *